United States Patent [19]
Jones et al.

[11] 3,826,230
[45] July 30, 1974

[54] FLOORING SYSTEM FOR STIES AND OTHER ANIMAL SHELTERS

[75] Inventors: Robert S. Jones, Pontiac; Harry W. Smathers, Aurora, both of Ill.

[73] Assignees: said Jones, by said Smathers; Wesley E. Jones, Park Forest South, Ill.

[22] Filed: May 14, 1973

[21] Appl. No.: 360,347

[52] U.S. Cl. .................................. 119/28, 52/727
[51] Int. Cl. ........................................... A01k 01/00
[58] Field of Search ............ 119/28, 27, 20, 16, 15; 52/727

[56] References Cited
UNITED STATES PATENTS

| | | | |
|---|---|---|---|
| 3,181,503 | 5/1965 | Tripp | 119/28 X |
| 3,461,844 | 8/1969 | Harrison | 119/28 |
| 3,528,391 | 9/1970 | Johnson | 119/28 |
| 3,530,831 | 9/1970 | Conover | 119/28 X |
| 3,603,052 | 9/1971 | Novoa | 52/727 X |
| 3,677,229 | 7/1972 | Blough et al. | 119/28 X |

FOREIGN PATENTS OR APPLICATIONS

| | | | |
|---|---|---|---|
| 956,451 | 4/1964 | Great Britain | 119/28 |

*Primary Examiner*—James H. Czerwonky
*Attorney, Agent, or Firm*—William S. McCurry

[57] ABSTRACT

A flooring system for sties and other animal shelters utilizing permanent, fluid conduit thermo-plastic slats or channel members which are adapted to be filled with concrete or the like. The filled channel members have traction surfaces on the exterior of their top walls. The inside of each top wall has arcuate groove means to properly position the conduit within the upper portion of the channel members.

1 Claim, 2 Drawing Figures

FLOORING SYSTEM FOR STIES AND OTHER ANIMAL SHELTERS

SUMMARY OF THE INVENTION

The present invention relates to sties and other animal shelters and more particularly to a flooring system for sties which is easily installed; easily maintained; non-corrosive; and having outstanding structural strength and integrity.

BACKGROUND OF THE INVENTION

For thousands of years farm animals were raised out-of-doors, seasonaly, in an open field. Recently, however, due to the cost of land, the enlightened farmer and advanced technology in equipment and foods, the raising of animals has been brought indoors and is a year-round activity.

A major problem in raising animals indoors is one of sanitation, in that tons of manure are excreted by a single animal during its short life span.

The development of flooring systems for indoor shelters has progressed steadily over the past few years from concrete flooring, to concrete slotted flooring, to steel slat flooring, to aluminum slat flooring, and then to plastic slat flooring. All these prior floorings have advantages and disadvantages with respect to the sanitation problems. Concrete chips and corrodes and is difficult to keep clean, whereas plastic and aluminum slats are sometimes lacking in structural strength.

An object of the present invention is to improve the floor of a shelter by providing better materials of construction to provide easier installation and maintenance of the flooring.

Another object of the invention is to combine the advantages of the plastic and aluminum slatted flooring by providing a relatively thin gauge plastic or aluminum slat which is filled with concrete or the like. Other objects and advantages will be apparent from the following detailed description of the flooring system, taken in conjunction with the appended drawings wherein:

THE DRAWINGS

DESCRIPTION OF THE INVENTION

Figure 1:
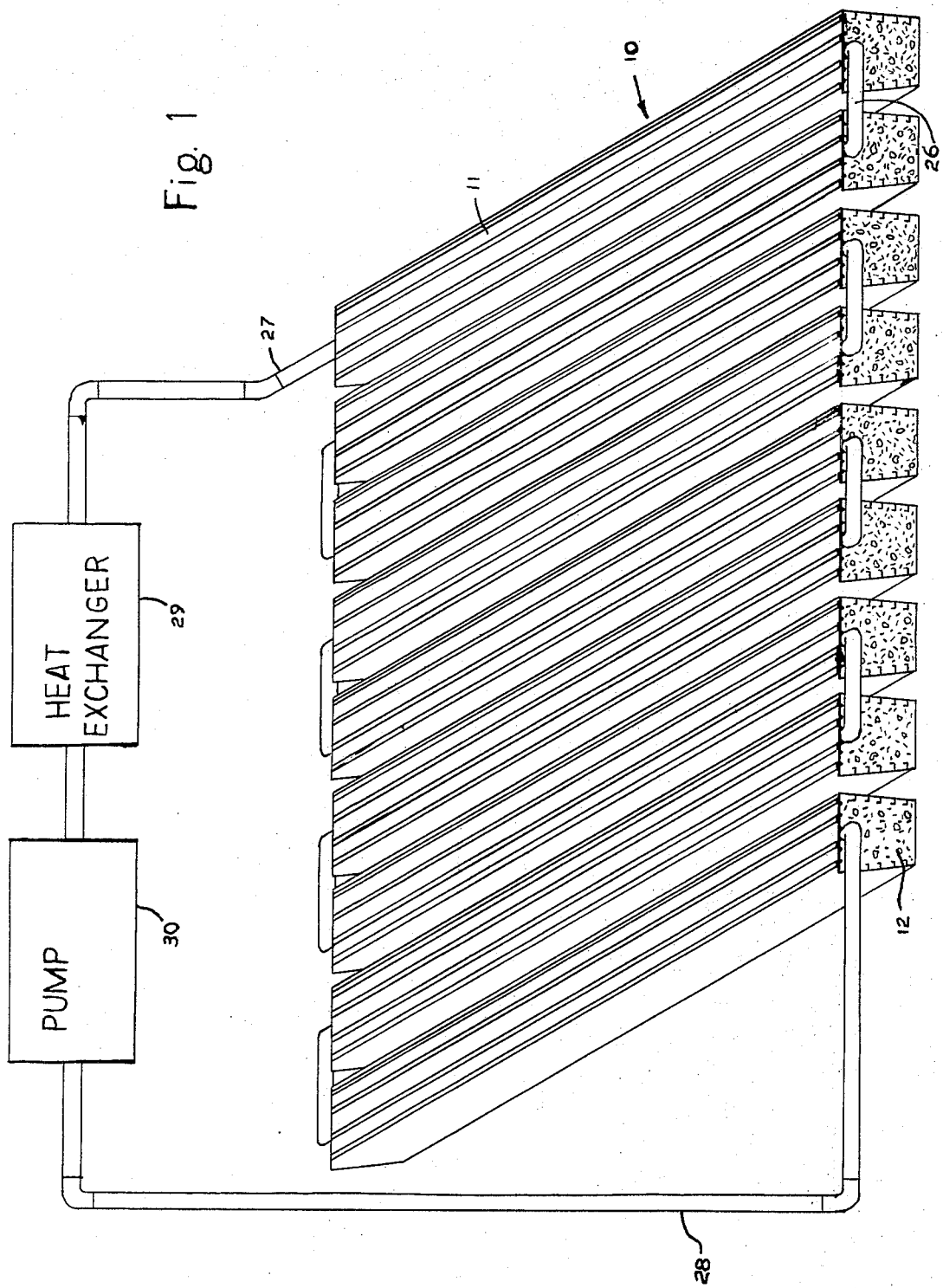
FIG. 1 is a perspective view of a floor for an animal shelter made in accordance with the present invention.

Referring to the drawings, there is disclosed in FIG. 1 a floor 10, made in accordance with the present invention and comprising a plurality of parallel, closely spaced concrete filled slats 11.

Figure 2:
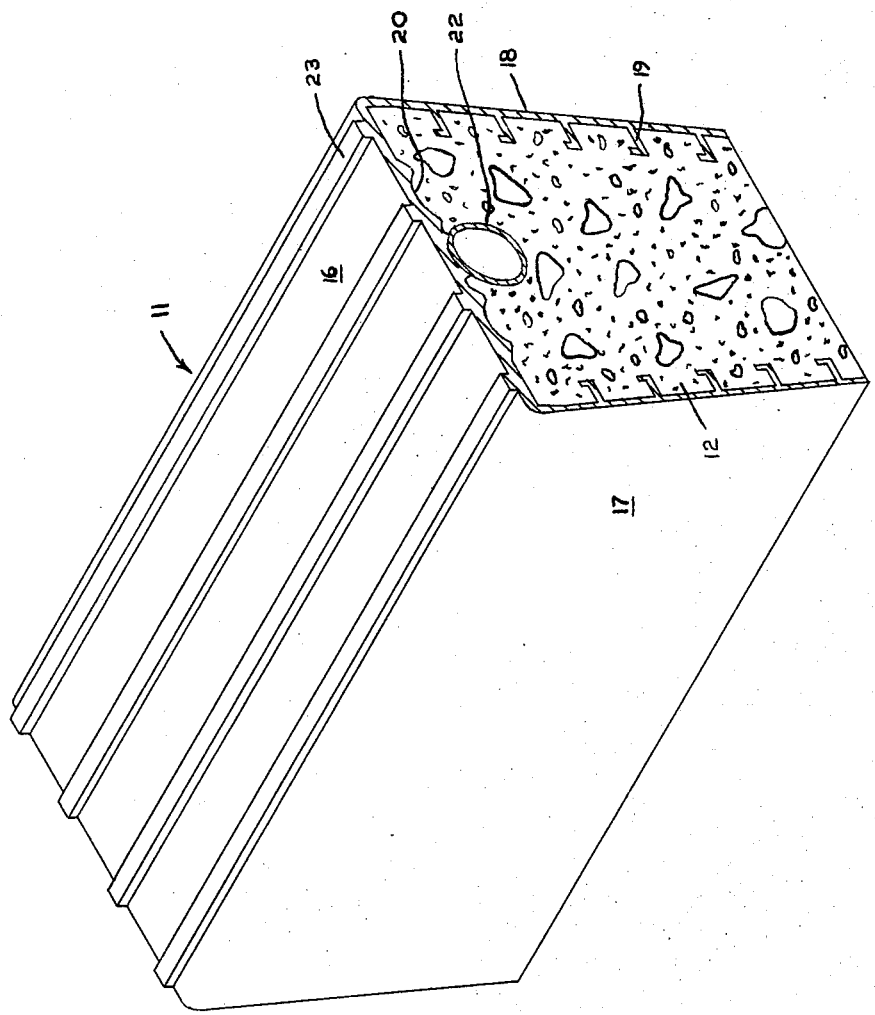
FIG. 2 is a perspective, sectional view of the improved slat utilized in the present flooring system.

The individual slats 11 serve as permanent forms and covering for the concrete 12 and, as best seen in FIG. 2, are elongated, U-shaped members having a top wall 16 and depending sidewalls 17, 18. The sidewalls 17, 18 are inclined inwardly to provide for easier egress of manure between the slats 11 into a drainage pit (not shown). Projecting inwardly from each of the side walls 17, 18 are a plurality of L-shaped anchor members 19 whose function will be explained hereinafter. The bottom side of the top wall 16 is provided with one or more arcuately shaped grooves 20 for receiving an arcuate portion of one or more fluid circulating conduits 22. The top side of the top wall 16 is provided with a plurality of ribs 23. The ribs 23 are multifunctional in that (1) they are traction surfaces to prevent slippage and give better footing for the animals and (2) they provide increased surface area for the dissipation of heat or cold from the fluid passing through the conduits 22.

The slats 11 are preferably made of extruded thermoplastic material such as polyvinylchloride, polystyrene or ABS (graft copolymer of acrylonitrile, butadiene and styrene). Other and suitable extrudable materials such as, for example, aluminum may be employed in fabricating the slats 11.

The extruded slats 11 are inverted in preparation for being filled with concrete. Fluid conduits, if desired, are placed in the grooves 20 and are of sufficient length to extend a short distance beyond the ends of the members 11. The ends of the slats 11 are then closed by an appropriate form or end closure, after which concrete is poured into the slats 11 and permitted to set. After the concrete has cured the L-shaped anchor members 19 are firmly embedded in the concrete and effectively prevent separation of the channel members 11 from the concrete 12.

To assemble the flooring 10, the concrete filled slat members 11 are placed over a drainage pit (not shown); are spaced by appropriate spacers (not shown); and the conduits 22 are connected to coupling conduits 26 and to fluid conduits 27, 28 which in turn are connected to a heat exchanger system comprising a heat exchanger 29 and a pump 30.

Thus the present flooring system, comprised of concrete filled channel members 11, is non-corrosive, is easily constructed and maintained, and provides for heating and/or cooling of the flooring in an efficient manner.

While only one preferred embodiment of the invention has been described, it is understood that other changes and modifications can be made without departing from the spirit of the invention which is set forth in the claims.

We claim:

1. A flooring system for an animal shelter adapted to support animals above a sanitation pit comprising a plurality of parallel, closely spaced, elongated concrete filled slat members containing conduit means defining interconnecting fluid passages for the transmission of fluid from one slat member to the other, and means for circulating fluid through said conduit means, each of said concrete filled slat members comprising an elongated channel member having at least a top wall and two side walls, the top wall having means providing traction surfaces, said top wall also having means to position said conduit means, said positioning means including one or more arcuate grooves in the bottom thereof for receiving the arcuate surface of said conduit means, and each of said side walls having a plurality of inwardly projecting anchor members for the retention of concrete in said channel members.

* * * * *